UNITED STATES PATENT OFFICE.

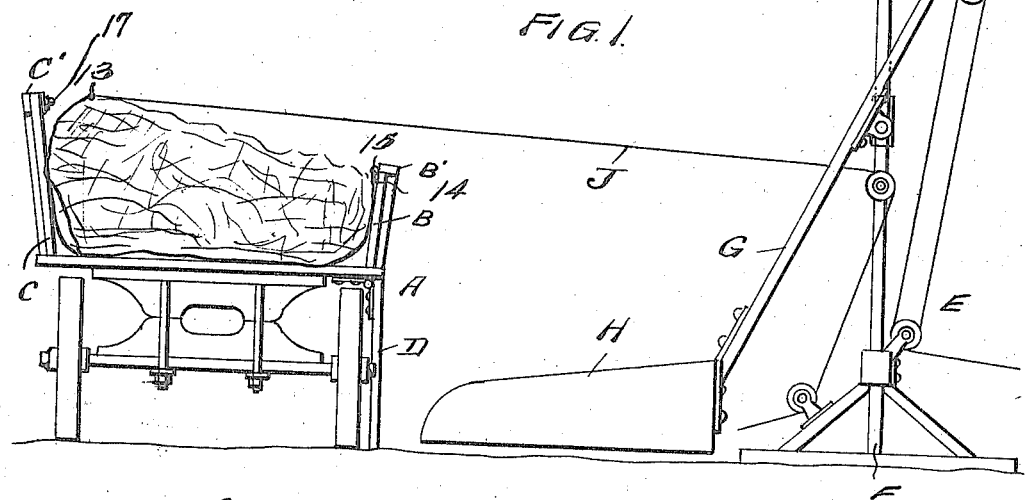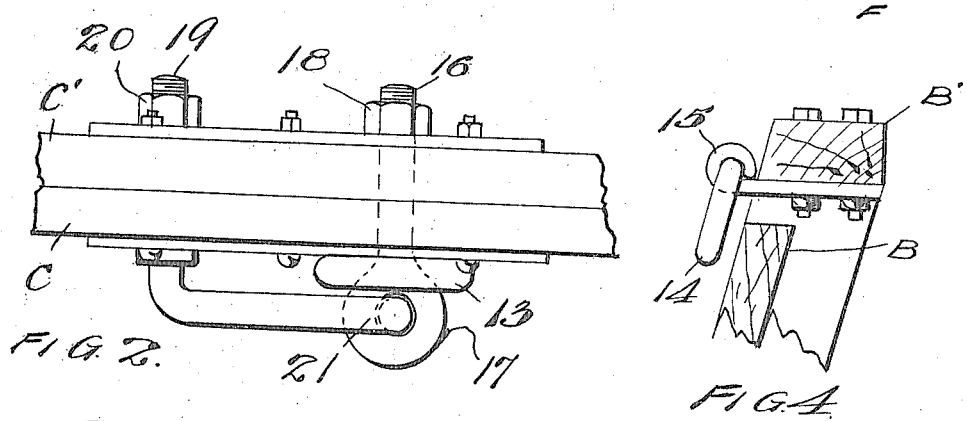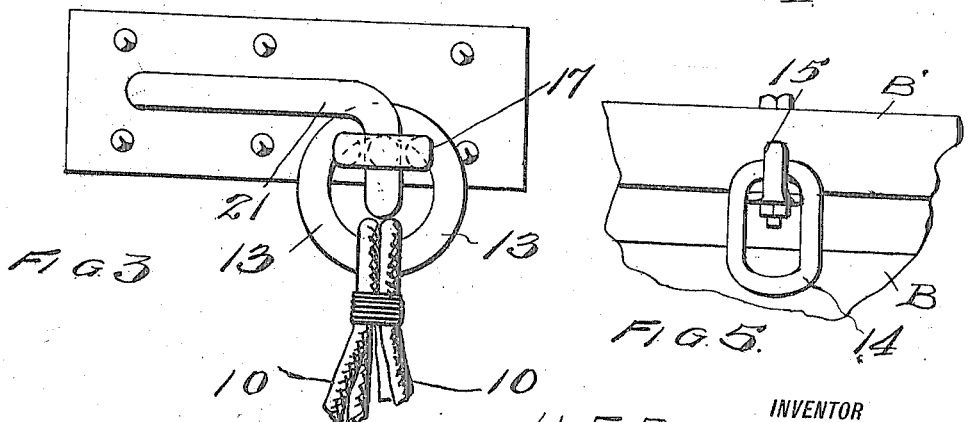

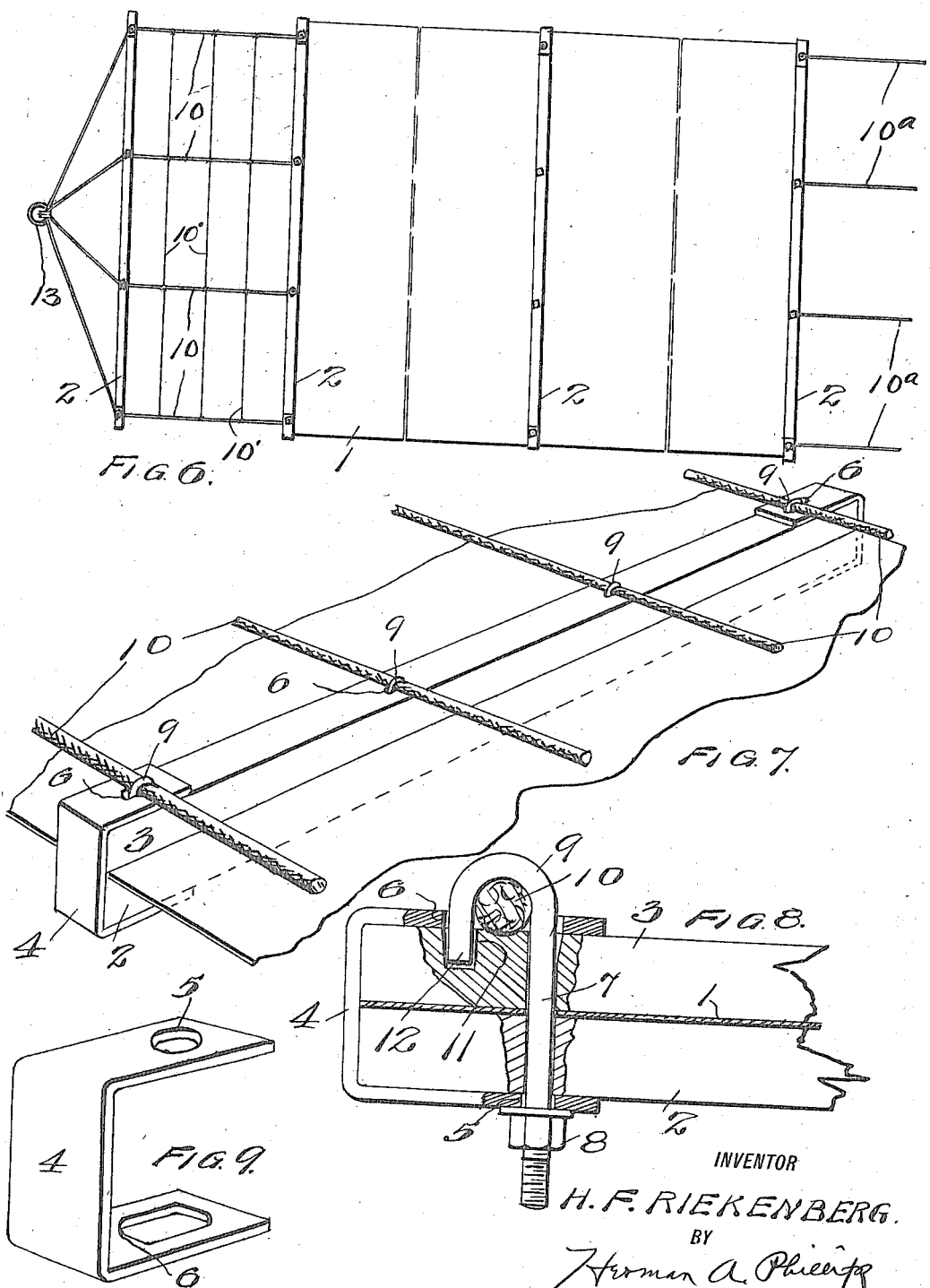

HENRY F. RIEKENBERG, OF SYLVAN GROVE, KANSAS.

HAY-SLING.

1,264,208.

Specification of Letters Patent. Patented Apr. 30, 1918.

Application filed October 22, 1917. Serial No. 197,864.

*To all whom it may concern:*

Be it known that I, HENRY F. RIEKENBERG, a citizen of the United States, residing at Sylvan Grove, in the county of Lincoln and State of Kansas, have invented certain new and useful Improvements in Hay-Slings, of which the following is a specification.

My present invention relates to hay slings, designed especially for use in connection with wagons or header boxes, for the purpose of unloading hay or headed grain therefrom.

The primary object of the invention is to improve the construction, in several particulars, of the invention embodied in my Patent No. 1,207,795, dated December 12, 1916, whereby the device is made more efficient and durable, and may be produced at less cost than formerly. To this end the invention consists in certain novelties of construction and combinations of parts as will be hereinafter more fully described and claimed.

I have illustrated my invention, in the accompanying drawings, as now perfected according to the best mode I have devised for the physical embodiment of my invention.

In the drawings which form part of the application, and in which like reference characters designate similar parts:

Figure 1 is a view showing the utility of my invention wherein the hay wagon is represented as loaded, the sling of my invention with its load of hay or headed grain being shown in the header box of the wagon, and the unloading fork or cradle being in position to receive the load.

Fig. 2 is an edge view showing one of the sides of the header box and a side rail, and the temporary attaching device for one end of the sling.

Fig. 3 is a front view of the attaching device shown in Fig. 2.

Fig. 4 is a sectional, fragmentary, view of the opposite side of the header box from that shown in Fig. 2, or the lower side and rail depicting one of the permanent attaching devices for the sling.

Fig. 5 is a front view of Fig. 4, as seen from the left.

Fig. 6 is a top plan view of the hay sling, partly broken away for convenience of illustration.

Fig. 7 is a fragmentary view in perspective of the bottom of the hay sling, showing one of the transverse slats or bars and the reinforcing ropes.

Fig. 8 is an enlarged detail, sectional, view showing the manner of clamping the sectional slats and the flexible apron of the sling.

Fig. 9 is a perspective view of one of the end caps for the transverse slats.

In the preferred embodiment of my invention as illustrated in the accompanying drawings I have utilized a typical hay wagon A with the customary header box having the low side B and the higher side C with their respective rails B' and C'. Preferably the loaded wagon is reinforced, before the loaded hay sling is removed therefrom, with a plurality of hinged braces as D, attached at the underside of the header box on the side to receive the strain of weight of the load of hay or headed grain as it is emptied from the header box through the instrumentality of the rope J on the mast F, and falls into the cradle H, and then the load of hay, headed grain, or straw is handled by the derrick arm G and rope E as usual.

The hay sling of the invention is made up of the usual flexible apron 1 which may be of canvas or other suitable material as desired, and this apron is reinforced at required intervals throughout its length and at its ends by sectional, transverse slats, the upper section being indicated as 2 and the lower section as 3, and the canvas apron is clamped between these sections. At the ends of the slats, U-shaped, metallic caps as 4 are fastened, each cap being fashioned with an upper arm perforated at 5, and a lower arm formed with an elongated perforation or slot 6 through which the clamp bolts 7 are designed to pass. As best seen in Fig. 8, these bolts are threaded to receive the clamp nuts 8 and are each provided with a U-shaped curved end 9 adapted to hook over the longitudinal, reinforcing ropes 10. The lower slat section 3 is bored out at 11 complementary to the slot 6 in the end cap, so that the end 12 of the hook on the bolt may be drawn therein as the nut 8 is screwed home to clamp the rope 10 as indicated in Fig. 8. It will readily be apparent that these clamping bolts with their hooked ends hold the sectional slats (and the canvas, through which the bolts pass) rigidly and securely, and that the ropes effectively reinforce the apron. An additional reinforcement is afforded by utilizing the transverse ropes 10' which are secured to the main ropes 10, and the ends 10ª of the ropes 10 extend beyond the end of the sling as indicated in Fig. 6 for a purpose to be described. At the opposite end of the sling, the ropes 10 are brought together, in pairs, and attached to a ring 13.

The rope ends 10ª are permanently attached to the attaching rings 14, which, by means of the hinge plates 15 are attached, at intervals, along the under side of the rail B' at the top of the lower side B of the header box.

At the top edge of the higher side C of the header box, and passing through the rail C' is a temporary attaching bolt 16 provided with the eye 17 at the inside of the box and threaded at the outer side of the box to receive the locking bolt 18 bearing against a plate or washer at the outer side of the rail C'. It will be apparent that this eye bolt 16 is designed to receive the ring 13 which is to be suspended thereon, as in Figs. 2 and 3, and a latch bolt 19, also passed through the rail C', is held in place by the nut 20, but is permitted to swing so that its hooked or bent end 21 may fit into the eye 13 of bolt 16 and prevent displacement of the suspending ring 13.

The utility and operation of the device will be apparent from an inspection of the drawings taken in connection with this specification, and it will be sufficient to say that when the sling is to be loaded the ring 13 is suspended on the eye 17 of bolt 16, it being remembered that the ends 10ª of ropes 10 are permanently attached to the rings 14 extending along the rail B' of the side B, and then the latch hook 21 is turned home into its keeper, formed by the eye 17, and the sling is loaded with hay or headed grain.

When ready for unloading the latch 21 is opened, the ring 13 is withdrawn from its bolt 16, and the rope J is attached to the ring 13 as shown in Fig. 1, and then the sling is emptied in the usual way.

While I have illustrated one complete example of the physical embodiment of my invention in the drawings, it will be understood that I contemplate changes and alterations in the construction and operation of the device, within the scope of my claim, without departing from the spirit of the invention.

The number of the transverse ropes 10' may be varied, according to needs, and these ropes are utilized to take the place of the apron, where the apron is not required, as this portion of the sling is suspended against the high side of the header box.

While I have shown but one hay sling in the drawings, it will of course be understood that two or more slings may be employed in the header box when desired.

What I claim is:—

The combination in a hay-sling with its flexible apron, a supporting rope and parallel, transverse slats above and below the apron, of U-shaped caps at the ends of the slats each having a slot and a perforation and a depressed portion in the slat sections complementary to the slots, a bolt passed through the sections, the apron and the slot and perforation and having a U-shaped hook extending into the depression and engaging the supporting rope, and a nut on the bolt for clamping the rope in the depression within the hook.

In testimony whereof I affix my signature in presence of two witnesses.

HENRY F. RIEKENBERG.

Witnesses:
W. H. BREIHAN,
C. E. LEWELLEN.